(12) United States Patent
Mitchell (10) Patent No.: US 10,088,688 B1
(45) Date of Patent: *Oct. 2, 2018

(54) COMPACT COMMON APERTURE IMAGER SYSTEM

(71) Applicant: Wavefront Research, Inc., Bethlehem, PA (US)

(72) Inventor: Thomas A. Mitchell, Nazareth, PA (US)

(73) Assignee: WAVEFRONT RESEARCH, INC., Northampton, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/430,693

(22) Filed: Feb. 13, 2017

Related U.S. Application Data (63) Continuation of application No. 14/587,268, filed on Dec. 31, 2014, now Pat. No. 9,568,737.

(60) Provisional application No. 61/922,448, filed on Dec. 31, 2013.

(51) Int. Cl.
| | |
|---|---|
| *G02B 27/14* | (2006.01) |
| *G02B 27/10* | (2006.01) |
| *H04N 5/30* | (2006.01) |
| *G02B 27/30* | (2006.01) |
| *G01J 3/28* | (2006.01) |

(52) U.S. Cl.
CPC ........ *G02B 27/1013* (2013.01); *G01J 3/2823* (2013.01); *G02B 27/141* (2013.01); *G02B 27/30* (2013.01); *H04N 5/30* (2013.01); *G01J 2003/2826* (2013.01)

(58) Field of Classification Search
CPC .... G02B 27/0905; G02B 27/10; G02B 27/14; G02B 27/144; G02B 27/149
USPC ................................. 359/618, 629, 638, 641
See application file for complete search history.

(56) References Cited

U.S. PATENT DOCUMENTS

| | | | |
|---|---|---|---|
| 3,492,076 A * | 1/1970 | Back .................. | G01M 11/0292 356/124.5 |
| 9,568,737 B1 * | 2/2017 | Mitchell ............ | G02B 27/1006 |
| 2007/0034803 A1 | 2/2007 | Plant | |

* cited by examiner

*Primary Examiner* — William Choi
(74) *Attorney, Agent, or Firm* — Burns & Levinson LLP; Orlando Lopez (57) ABSTRACT

An optical imager design that is capable of imaging a common scene to two or more optical systems, and is more compact in physical size and superior in throughput than previous designs is disclosed.

4 Claims, 6 Drawing Sheets

COMPACT COMMON APERTURE IMAGER SYSTEM

CROSS REFERENCE TO RELATED APPLICATIONS

This application is a continuation of co-pending U.S. patent application Ser. No. 14/587,268, filed on Dec. 31, 2014, entitled COMPACT COMMON APERTURE OPTICAL RELAY SYSTEM, which in turn claims priority to and benefit of U.S. Provisional Application No. 61/922,448, filed on Dec. 31, 2013, which is incorporated by reference herein in its entirety and for all purposes.

STATEMENT OF FEDERALLY SPONSORED RESEARCH OR DEVELOPMENT

This invention was made with U.S. Government support from the U.S. Army under contract W15P7T-06-D-R401, subcontract R401-SC-20316-0252. The U.S. Government has certain rights in the invention.

BACKGROUND

These teachings relate generally to optical systems that can re-image an image plane or pupil from a shared location to two or more optical systems.

In common aperture systems, it is often desirable to provide access to a shared optical component, pupil, imager, or system for two or more optical systems simultaneously. This can be difficult to achieve as a result of tradeoffs between the back focal distance requirements of the individual systems, obstructions due to optical or mechanical components, and other concerns.

SUMMARY

The embodiments of the present teachings provide the capability to image a common scene to two or more optical systems in a design form that is more compact in physical size and superior in spectral imaging quality than previous designs.

In one or more embodiments, the system of these teachings includes a first optical system having at least one refractive or reflective element, the first optical system configured to substantially receive electromagnetic radiation emanating from a source, the first optical system being configured to substantially collimate the electromagnetic radiation emanating from the source, a beam splitter optically disposed to receive the electromagnetic radiation from the first optical system, the beam splitter being configured to substantially transmit a first portion of the electromagnetic radiation from the first optical system and also being configured to substantially reflect a second portion of the electromagnetic radiation from the first optical system, a second optical system having at least one refractive or reflective element, the second optical system being optically disposed to receive the first portion of electromagnetic radiation from the beam splitter and being configured to substantially focus the first portion of electromagnetic radiation to a first image plane, the first image plane being optically disposed to receive the first portion of electromagnetic radiation, and a third optical system having at least one refractive or reflective element, the third optical system being optically disposed to receive the second portion of electromagnetic radiation from the beam splitter and being configured to substantially focus the second portion of electromagnetic radiation to a second image plane, the second image plane being optically disposed to receive the second portion of electromagnetic radiation.

For a better understanding of the present teachings, reference is made to the accompanying drawings and detailed description and its scope will be pointed out in the appended claims.

DETAILED DESCRIPTION

The following detailed description presents the currently contemplated modes of carrying out these teachings. The description is not to be taken in a limiting sense, but is made merely for the purpose of illustrating the general principles of the invention, since the scope of the invention is best defined by the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

A "beam splitter," as used herein, refers to any component for separating electromagnetic radiation.

These teachings relate generally to common aperture optical systems, and, more particularly, to an optical imager design that is capable of imaging a common scene to two or more optical systems, and is more compact in physical size and superior in throughput than previous designs.

In common aperture systems, it is often desirable to provide access to a shared optical component, pupil, imager, or system for two or more optical systems simultaneously. This can sometimes be difficult to achieve as a result of tradeoffs between the back focal distance requirements of the individual systems, obstructions due to optical or mechanical components, optical speed or throughput, and other considerations.

For example, consider some applications of imaging sensors, in which, for example, it is desirable to have a common fore-optics for two distinct imaging systems in order to provide co-registered imagery or to minimize size and weight by using a single shared imager component. The embodiments of the compact common aperture imager system of these teachings provide a compact method to provide the same imagery to two separate imaging systems, as described below.

Figure 1:
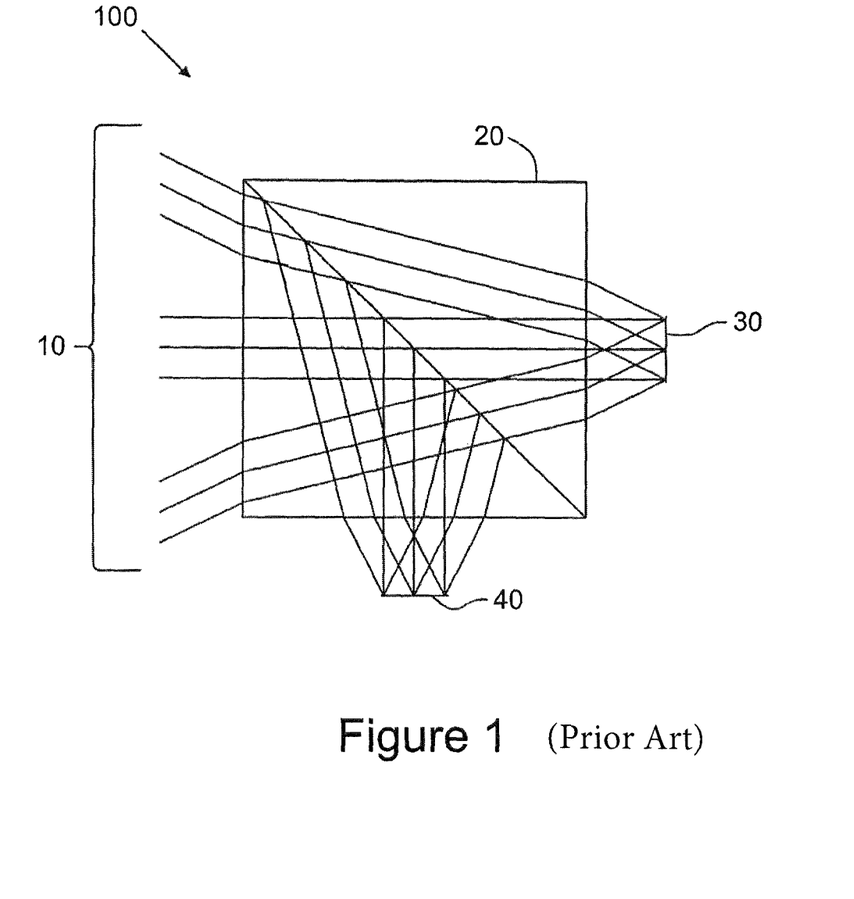
FIG. 1 is a schematic view of a portion of a typical common aperture system, taken along its optical axis.

Reference is made to FIG. 1, which is a schematic view of an embodiment of a portion of a typical common imager system, taken along the optical axis. Electromagnetic radiation, typically in the ultraviolet, visible, and/or infrared bands, hereinafter referred to generally as light, emitted or reflected by a given object, either real or virtual, hereinafter referred to generally as the source (not shown), located at the object plane (not shown) is imaged by a common imager (not shown) to a focus. Converging light 10 from the common imager, is incident upon a beam splitter element 20, the preferred embodiment of which is, but not limited to, a cube beam splitter, but in general is any method of separating light, hereinafter referred to generally as a beam splitter, which is capable of substantially transmitting a first portion of the light to a first focus 30, and capable of substantially reflecting a second portion of the light to a second focus 40.

In many cases, such as but not limited to, high throughput or fast optical speed systems, the size of the beam splitter element required such that the converging beam is not vignetted by the beam splitter, can become increasingly large. In other cases, such as but not limited to, systems requiring large back focus distances between the last optical element in the system and the focus, the size of the beam splitter element required can also become increasingly large. It is therefore advantageous to provide an alternate beam splitter system design that reduces the required size of the beam splitter element in these cases.

Figure 2:
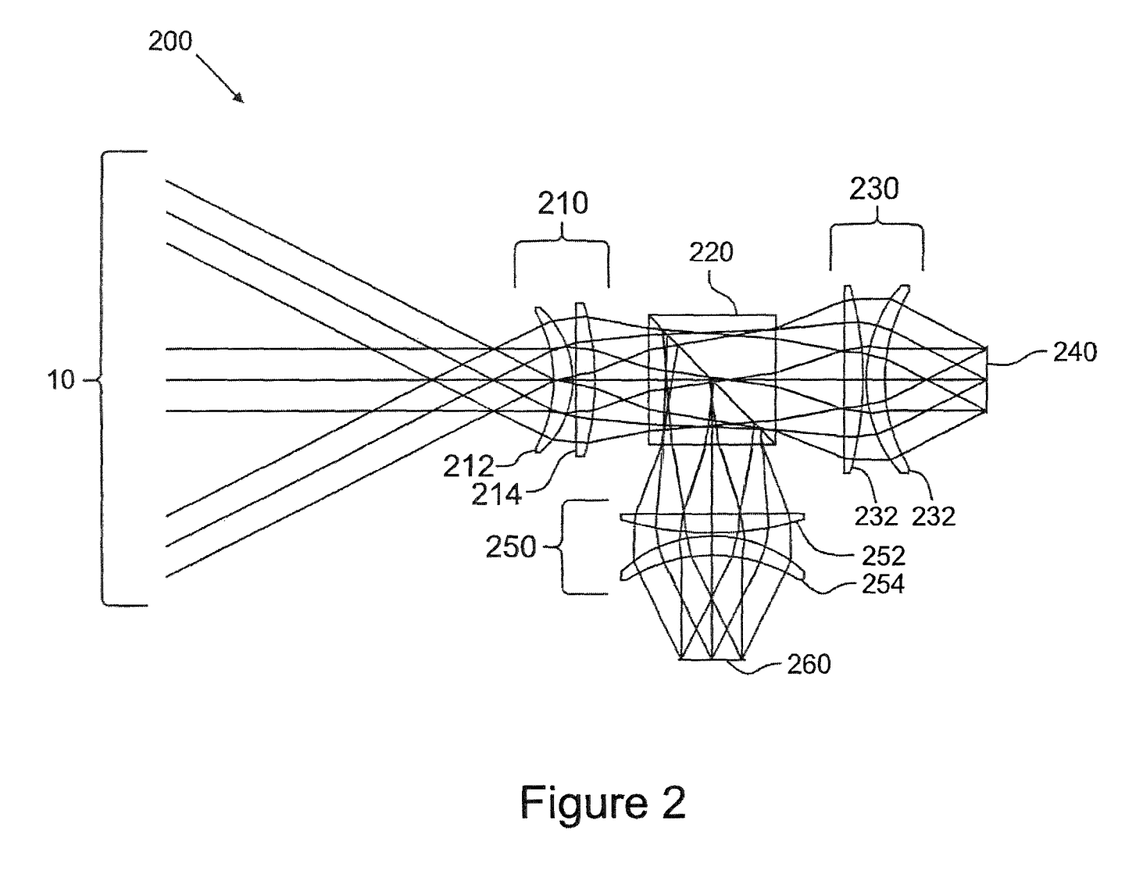
FIG. 2 is a schematic view of an embodiment of the present teachings, taken along its optical axis.

Reference is made to FIG. 2, which is a schematic view of an embodiment of the present teachings 200. Converging light 10 from a common imager (not shown), is incident on a collimating optical system 210 made up of either refractive or reflective elements or combination thereof, in this embodiment made up of refractive elements 212 and 214, that is capable of substantially receiving the converging light 10 from the common imager and substantially collimating the light. This substantially collimated light is then incident upon a beam splitter 220, in this embodiment made up of, but not limited to, a beam splitter cube, but in general is any method of separating light, which is capable of substantially transmitting a first portion of the light and capable of substantially reflecting a second portion of the light. The first portion of the light is then incident upon a first focusing optical system 230 made up of either refractive or reflective elements or combination thereof, in this embodiment made up of refractive elements 232 and 234, that is capable of substantially receiving the first portion of the light and substantially focusing the light onto a first focus 240. The second portion of the light is incident upon a second focusing optical system 250 made up of either refractive or reflective elements or combination thereof, in this embodiment made up of refractive elements 252 and 254, that is capable of substantially receiving the second portion of the light and substantially focusing the light onto a second focus 260. In this manner, the substantially collimated light transmitted and reflected by the beam splitter 220 has a smaller optical footprint on the beam splitter 220 than it would typically have from the converging light 10 from the common imager itself, thereby reducing the overall size requirements on the beam splitter.

In many cases, such as but not limited to, hyperspectral imaging systems, it is advantageous to relay the first focus and the second focus each through a first and second optical relay system, such as but not limited to a spectrometer, respectively.

Figure 3:
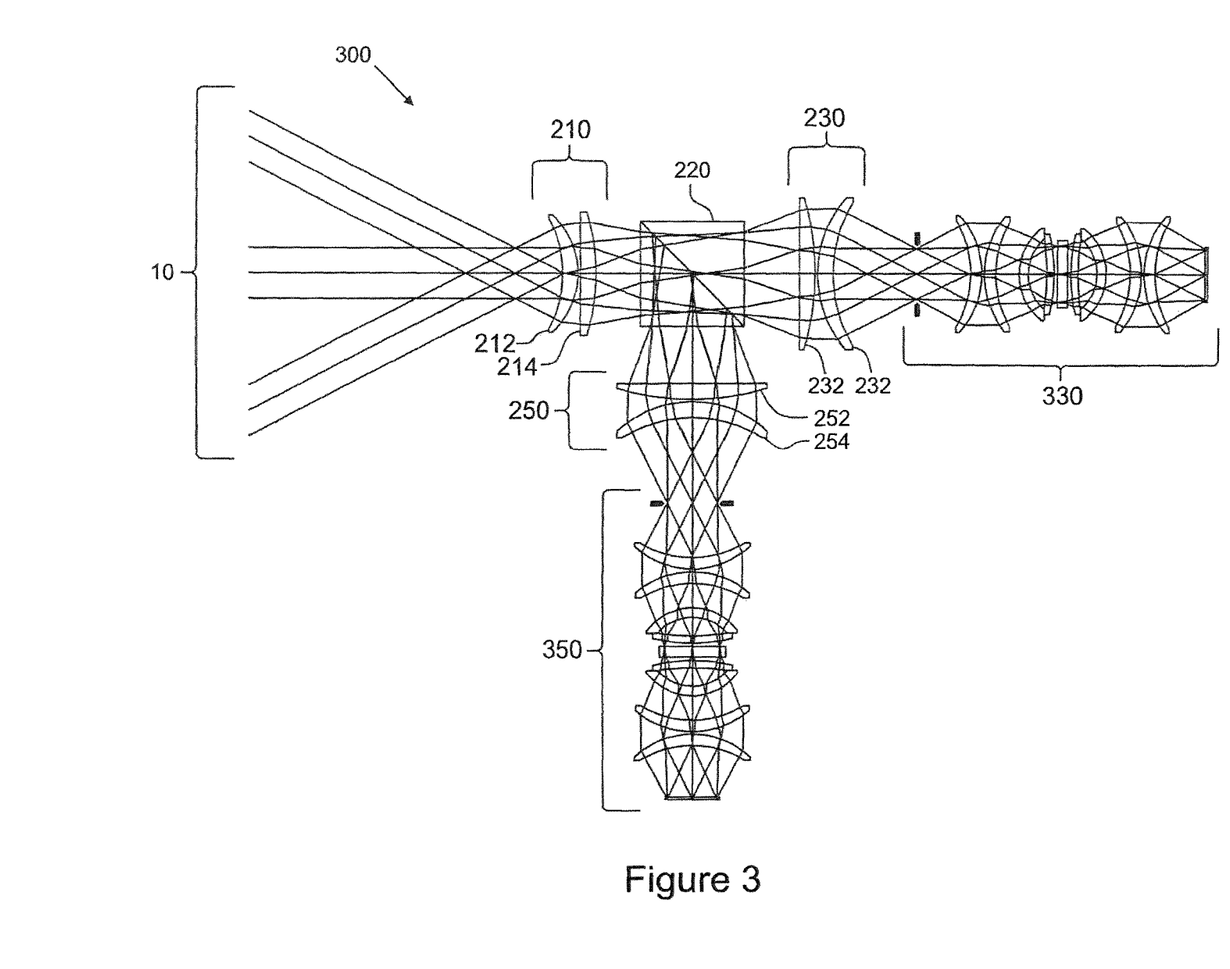
FIG. 3 is a schematic view of another embodiment of the present teachings, taken along its optical axis.

Reference is made to FIG. 3, which is a schematic view of an embodiment of the present teachings 300. Converging light 10 from a common imager (not shown), is incident on a collimating optical system 210 made up of either refractive or reflective elements or combination thereof, in this embodiment made up of refractive elements 212 and 214, that is capable of substantially receiving the converging light 10 from the common imager and substantially collimating the light. This substantially collimated light is then incident upon a beam splitter 220, in this embodiment made up of, but not limited to, a beam splitter cube, but in general is any method of separating light, which is capable of substantially transmitting a first portion of the light and capable of substantially reflecting a second portion of the light. The first portion of the light is then incident upon a first focusing optical system 230 made up of either refractive or reflective elements or combination thereof, in this embodiment made up of refractive elements 232 and 234, that is capable of substantially receiving the first portion of the light and substantially focusing the light. The first portion of the light is then incident upon a first optical relay system 330 made up of either refractive or reflective elements or combination thereof, in this embodiment made up of refractive elements, which is capable of substantially receiving the first portion of the light. The second portion of the light is incident upon a second focusing optical system 250 made up of either refractive or reflective elements or combination thereof, in this embodiment made up of refractive elements 252 and 254, that is capable of substantially receiving the second portion of the light and substantially focusing the light. The second portion of the light is then incident upon a second optical relay system 350 made up of either refractive or reflective elements or combination thereof, in this embodiment made up of refractive elements, which is capable of substantially receiving the second portion of the light.

Figure 4:
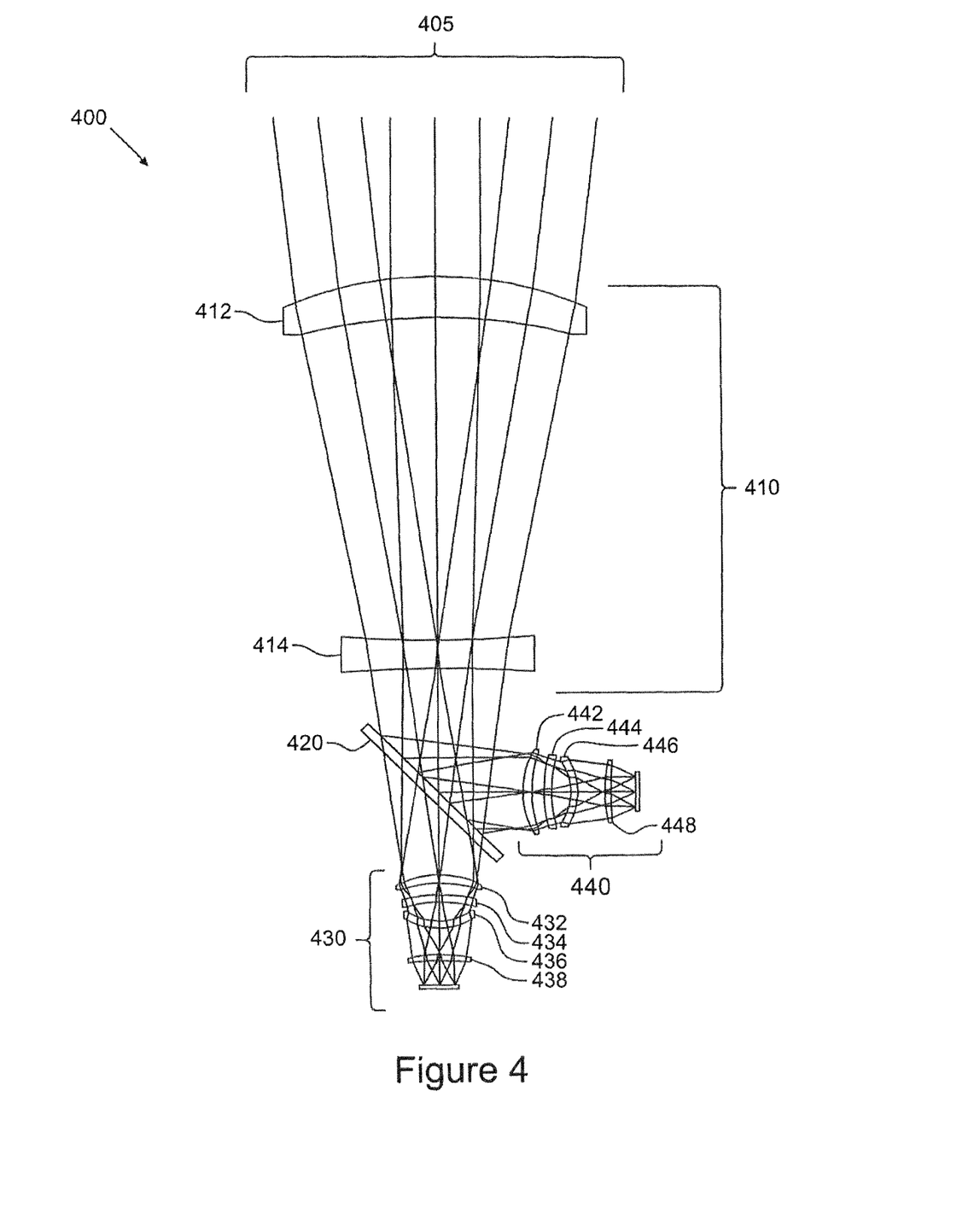
FIG. 4 is a schematic view of still another embodiment of the present teachings, taken along its optical axis.

Reference is made to FIG. 4, which is a schematic view of an embodiment of the present teachings 400. Light from a source (not shown) located at the object plane (not shown) is incident upon an afocal optical system 410 made up of either refractive or reflective elements or combination thereof, in this embodiment made up of refractive elements 412 and 414, which is capable of substantially receiving the light from the source and substantially collimating the light. This substantially collimated light is then incident upon a beam splitter 420, in this embodiment made up of, but not limited to, a dichroic window, but in general is any method of separating light, which is capable of substantially transmitting a first portion of the light and capable of substantially reflecting a second portion of the light. The first portion of the light is then incident upon a first focusing optical system 430 made up of either refractive or reflective elements or combination thereof, in this embodiment made up of refractive elements 432, 434, 436, and 438, which is capable of substantially receiving the first portion of the light. The second portion of the light is incident upon a second focusing optical system 440 made up of either refractive or reflective elements or combination thereof, in this embodiment made up of refractive elements 442, 444, 446, and 448, that is capable of substantially receiving the second portion of the light.

Although the optical fields of this embodiment are shown to be in the same plane as the schematic view illustrated in FIG. 4, these fields can also be in the plane orthogonal to the plane illustrated and are not limited in extent to that shown, and in fact any number of field geometries can be used and can be spatial or angular in design.

Figure 5:
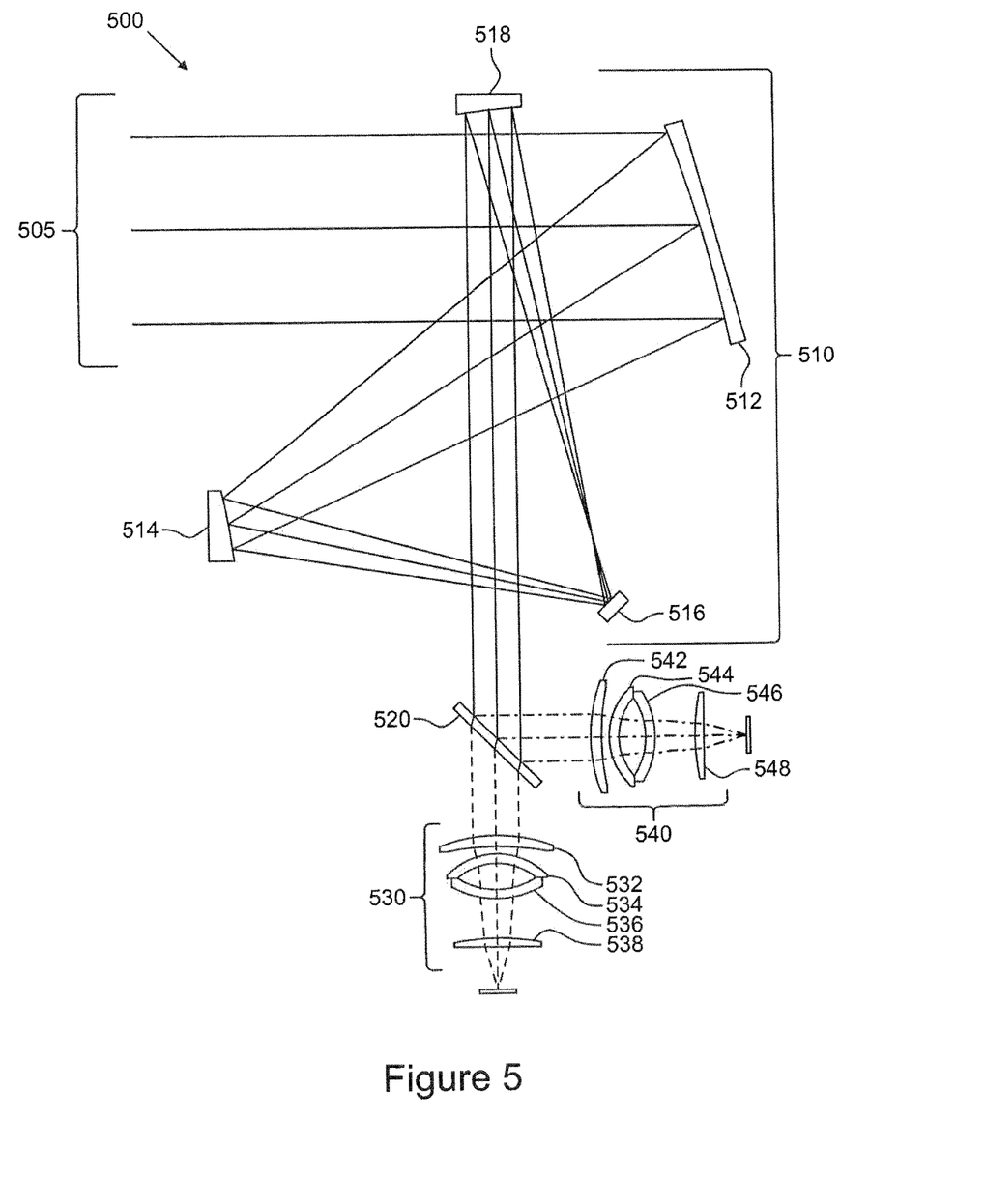
FIG. 5 is a schematic view of a further embodiment of the present teachings, taken along its optical axis.

Reference is made to FIG. 5, which is a schematic view of an embodiment of the present teachings 500. Light from a source (not shown) located at the object plane (not shown) is incident upon an afocal optical system 510 made up of either refractive or reflective elements or combination thereof, in this embodiment made up of reflective elements 512, 514, 516, and 518, which is capable of substantially receiving the light from the source and substantially collimating the light. This substantially collimated light is then incident upon a beam splitter 520, in this embodiment made up of, but not limited to, a dichroic window, but in general is any method of separating light, which is capable of substantially transmitting a first portion of the light and capable of substantially reflecting a second portion of the light. The first portion of the light is then incident upon a first focusing optical system 530 made up of either refractive or reflective elements or combination thereof, in this embodiment made up of refractive elements 532, 534, 536, and 538, which is capable of substantially receiving the first portion of the light. The second portion of the light is incident upon a second focusing optical system 540 made up of either refractive or reflective elements or combination thereof, in this embodiment made up of refractive elements 542, 544, 546, and 548, that is capable of substantially receiving the second portion of the light.

Figure 6:
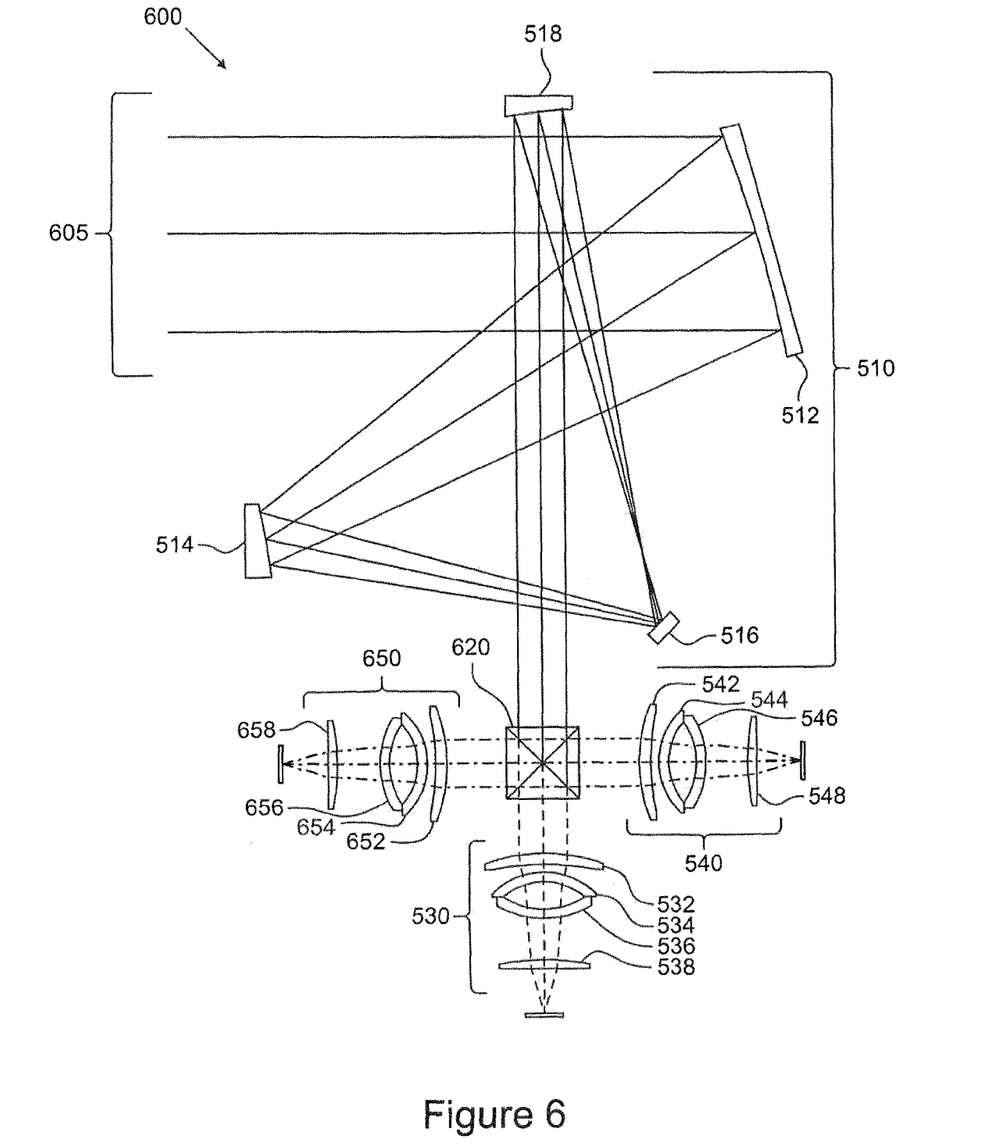
FIG. 6 is a schematic view of a still further embodiment of the present teachings, taken along its optical axis.

Reference is made to FIG. 6, which is a schematic view of an embodiment of the present teachings 600. Light from a source (not shown) located at the object plane (not shown) is incident upon an afocal optical system 510 made up of either refractive or reflective elements or combination thereof, in this embodiment made up of reflective elements 512, 514, 516, and 518, which is capable of substantially receiving the light from the source and substantially collimating the light. This substantially collimated light is then incident upon a beam splitter 520, in this embodiment made up of, but not limited to, a cube beamsplitter, but in general is any method of separating light, which is capable of substantially transmitting a first portion of the light and capable of substantially reflecting a second portion of the light in a first direction and capable of substantially reflecting a third portion of the light in a second direction. The first portion of the light is then incident upon a first focusing optical system 530 made up of either refractive or reflective elements or combination thereof, in this embodiment made up of refractive elements 532, 534, 536, and 538, which is capable of substantially receiving the first portion of the light. The second portion of the light is incident upon a second focusing optical system 540 made up of either refractive or reflective elements or combination thereof, in this embodiment made up of refractive elements 542, 544, 546, and 548, that is capable of substantially receiving the second portion of the light. The third portion of the light is incident upon a third focusing optical system 650 made up of either refractive or reflective elements or combination thereof, in this embodiment made up of refractive elements 652, 654, 656, and 658, that is capable of substantially receiving the third portion of the light.

Any number of optical systems can be used in the embodiments of the present teachings. The beam splitting component can be separated by any number of methods, such as, but not limited to, wavelength and polarization, and can be made up of a dichroic filter, cube beam splitter, or any other means by which light can be separated.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although these teachings have been described with respect to various embodiments, it should be realized these teachings are also capable of a wide variety of further and other embodiments within the spirit and scope of the appended claims.

The invention claimed is:
1. An optical imaging system comprising:
  a first optical system having at least one refractive or reflective element; the first optical system configured to substantially receive electromagnetic radiation emanating from a source; the first optical system being configured to substantially collimate the electromagnetic radiation emanating from the source;
  a beam splitting device optically disposed to receive the electromagnetic radiation from the first optical system; the beam splitting device being configured to substantially split a first portion of the electromagnetic radiation from the first optical system in a first direction; the beam splitting device also being configured to substantially split a second portion of the electromagnetic radiation from the first optical system in a second direction;
  a second optical system having at least one refractive or reflective element; the second optical system being optically disposed to receive the first portion of electromagnetic radiation from the beam splitting device; the second optical system being configured to substantially focus the first portion of the electromagnetic radiation to an intermediate first image plane; the intermediate first image plane being optically disposed to receive the first portion of electromagnetic radiation;
  a third optical system having at least one refractive or reflective element; the third optical system being optically disposed to receive the second portion of electromagnetic radiation from the beam splitting device; the third optical system being configured to substantially focus the second portion of electromagnetic radiation to a second image plane; the second image plane being optically disposed to receive the second portion of electromagnetic radiation; and
  a fourth optical system having at least one refractive or reflective element; the fourth optical system being optically disposed to receive the first portion of electromagnetic radiation from the second optical system; wherein the fourth optical system is a spectrometer.

2. The optical imaging system of claim 1 wherein the second image plane is an intermediate second image plane; and wherein the optical imaging system further comprises:
  a fifth optical system having at least one refractive or reflective element; the fifth optical system being optical disposed to receive the second portion of electromagnetic radiation from the third optical system.

3. The optical imaging system of claim 2 wherein the fifth optical system is a spectrometer.

4. An optical imaging system comprising:
  a first optical system having at least one refractive or reflective element; the first optical system configured to substantially receive electromagnetic radiation emanating from a source; the first optical system being configured to substantially collimate the electromagnetic radiation emanating from the source;
  a beam splitting device optically disposed to receive the electromagnetic radiation from the first optical system; the beam splitting device being configured to substantially split a first portion of the electromagnetic radiation from the first optical system in a first direction; the beam splitting device also being configured to substantially split a second portion of the electromagnetic radiation from the first optical system in a second direction;

a second optical system having at least one refractive or reflective element; the second optical system being optically disposed to receive the first portion of electromagnetic radiation from the beam splitting device; the second optical system being configured to substantially focus the first portion of the electromagnetic radiation to an intermediate first image plane; the intermediate first image plane being optically disposed to receive the first portion of electromagnetic radiation;

a third optical system having at least one refractive or reflective element; the third optical system being optically disposed to receive the second portion of electromagnetic radiation from the beam splitting device; the third optical system being configured to substantially focus the second portion of electromagnetic radiation to an intermediate second image plane; the second intermediate image plane being optically disposed to receive the second portion of electromagnetic radiation;

a fourth optical system having at least one refractive or reflective element; the fourth optical system being optically disposed to receive the first portion of electromagnetic radiation from the second optical system; and a fifth optical system having at least one refractive or reflective element; the fifth optical system being optical disposed to receive the second portion of electromagnetic radiation from the third optical system;

wherein the fifth optical system is a spectrometer.

* * * * *